(12) United States Patent
Karau

(10) Patent No.: US 6,338,267 B1
(45) Date of Patent: Jan. 15, 2002

(54) SYSTEM FOR REJECTING NOISE IN IGNITION KNOCK DATA

(75) Inventor: Philip Allen Karau, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/506,186

(22) Filed: Feb. 17, 2000

(51) Int. Cl.[7] ............................................. G01L 23/22
(52) U.S. Cl. ..................................... 73/35.03; 73/35.05
(58) Field of Search ............................ 73/35.01, 35.03, 73/35.04, 35.05, 35.06, 35.08; 123/435

(56) References Cited

U.S. PATENT DOCUMENTS

| | | | | |
|---|---|---|---|---|
| 4,346,586 A | * | 8/1982 | Furrey ........................ | 73/35.05 |
| 4,437,334 A | * | 3/1984 | Laurenz ...................... | 73/35.07 |
| 4,444,042 A | * | 4/1984 | Bonitz et al. ............... | 73/35.03 |
| 4,455,862 A | * | 6/1984 | Takeuchi .................... | 73/35.03 |
| 4,565,087 A | * | 1/1986 | Damson et al. ............ | 73/35.04 |
| 4,943,776 A | * | 7/1990 | Polito et al. ................ | 73/35.03 |
| 5,537,855 A | * | 7/1996 | Hunninghaus et al. ..... | 73/35.05 |
| 6,230,546 B1 | * | 5/2001 | Wilstermann et al. ..... | 73/35.08 |

* cited by examiner

Primary Examiner—Helen Kwok
(74) Attorney, Agent, or Firm—Vincent A. Chichosz

(57) ABSTRACT

A device for rejecting noise in an ion-sense ignition knock signal compares an integrated knock signal to a peak knock signal multiplied by a time factor to determine the presence of noise. A bandpass filter coupled to an engine's spark plug through ion-sensing circuitry generates a filtered knock signal. The filtered knock signal is passed through a rectifier to produce a rectified knock signal. The rectified knock signal is then passed through an integrator and a peak detector to produce an integrated knock signal and a peak knock signal, respectively. The peak knock signal is multiplied by a predetermined time factor and the result is compared to the integrated knock signal. If the result is less than the integrated knock signal, then no noise disturbance occurred and the integrated knock signal is passed on to a knock detector. If, on the other hand, the result is greater than the integrated knock signal, a noise disturbance has occurred and the integrated signal is reduced to some minimum value before being passed on to the knock detector.

21 Claims, 1 Drawing Sheet

SYSTEM FOR REJECTING NOISE IN IGNITION KNOCK DATA

TECHNICAL FIELD

The present invention relates generally to engine noise rejection and more particularly, to a system for rejecting noise in engine ignition knock data.

BACKGROUND ART

Premature detonation, pre-ignition, or combustion knock, occurs in internal combustion engines when the air/fuel mixture is being compressed by the engine cylinder and the compression temperature causes auto-ignition of the air/fuel mixture prior to ignition of the spark plug for that cylinder. Combustion knock can also occur when some or all of the air fuel mixture in the combustion chamber auto-ignites, or detonates, due to excessive in-cylinder compression temperature.

Premature detonation or knocking can cause severe damage to an engine as the pressure wave from the knock can destroy the cylinder thermal boundary layer, causing the cylinder and piston to reach temperatures near the actual temperature of combustion. In an engine, this elevated temperature, combined with the pressure wave from the knock, can adversely affect the piston crown, which has a melting point much lower than the temperature of combustion. Even in engines with steel cylinder liners that can withstand the elevated temperatures, the piston rings in contact with the liners can be adversely affected by the elevated temperatures and may fail. Allowing an engine to operate under a knocking condition can therefore possibly lead to severe engine damage.

The detection of knocking is thus of significant interest in regulating the mixture composition and/or the instant of ignition. Detecting knocking with the aid of torque meters, acceleration meters or microphones is already known. However, such methods require frequency filters that permit the passage of a frequency that is specific for knocking. Knocking cannot be extracted as a pure signal in this manner, but only as a derived signal.

The detection of knocking with the aid of an ionic current sensor is also known. More specifically, when a spark is produced at the spark plug and the air/fuel mixture burns in the combustion chamber, the air/fuel mixture is ionized. When a voltage is applied to the spark plug while the mixture is in the ionized state, an ion current is generated. The occurrence of knock can be detected by detecting and analyzing this ion current. Usually, when knock occurs, an oscillating component of six kHz to seven kHz appears in the ion current. The knock detection device based on the ion current extracts this frequency component peculiar to knock by means of a filter, and analyzes the knocking condition based on the magnitude of that component.

It has been ascertained that the output signal of the ionic current sensor has low and high frequency components and that the high frequency components increase in uniformity with the intensity of engine knocking. The difficulty has been the separation of the low frequency ionic currents and high frequency noise from the high frequency ionic currents that are specific for knocking. Some of the high frequency noise can be reduced, but there are periodic occurrences of high-energy bursts that cannot be easily filtered out using ordinary electronic filters.

To this end, several practical solutions have been attempted. Typically, the high-energy bursts usually have higher voltage amplitudes then a knock signal. Therefore, one method to discriminate between a valid knock and noise is based upon voltage amplitude. When the ion signal peak amplitude is high, the signal is noise. Unfortunately, not all of the noise bursts have higher amplitudes. This results in having to trade-off how much noise to tolerate versus lowering the threshold and rejecting a certain percentage of true knock events. Another problem with this method is that the voltage threshold needs to vary with different operating conditions, i.e. temperature, humidity, different fuels, age of the engine, etc.

The disadvantages associated with these conventional noise rejection techniques have made it apparent that a new technique for rejecting noise in ignition knock data is needed. Preferably, the new technique would be able to accurately discriminate between ignition knock data and noise. The new technique should also not vary with different operating conditions.

SUMMARY OF THE INVENTION

It is, therefore, an object of the invention to provide an improved and reliable means for accurately determining and minimizing noise in ignition knock data. Another object of the invention is to accurately discriminate between ignition knock data and noise.

In one aspect of the invention, a device for rejecting noise in an ion-sense ignition knock signal compares an integrated knock signal to a peak knock signal multiplied by a time factor to determine the presence of noise. A bandpass filter coupled to an engine's spark plug through ion-sensing circuitry generates a filtered knock signal. The filtered knock signal is passed through a rectifier to produce a rectified knock signal. The rectified knock signal is then passed through an integrator and a peak detector to produce an integrated knock signal and a peak knock signal, respectively. The peak knock signal is multiplied by a predetermined time factor and the result is compared to the integrated knock signal. If the result is less than the integrated knock signal, then a noise disturbance has not occurred and the integrated knock signal is passed on to a knock detector. If, on the other hand, the result is greater than the integrated knock signal, a noise disturbance has occurred and the integrated signal is reduced to some minimum value before being passed on to the knock detector.

The present invention thus achieves an improved and reliable means for rejecting noise in ignition knock data. Also, the present invention is advantageous in that it does not vary with different operating conditions.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODE(S) FOR CARRYING OUT THE INVENTION

Figure 1:
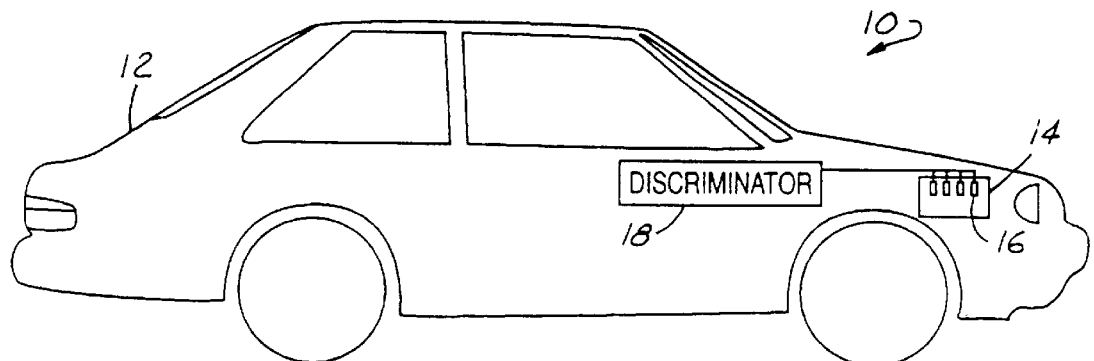
FIG. 1 is a depiction of a vehicle system for rejecting noise in an ion-sense ignition knock signal in accordance with one embodiment of the present invention.

Referring to FIG. 1, a vehicle system 10 for rejecting noise in an ion-sense ignition knock signal in accordance with one embodiment of the present invention is depicted. Vehicle system 10 includes a vehicle 12 having an internal combustion engine 14. Engine 14 includes at least one spark plug 16 located in a combustion chamber. Spark plug 16 produces a spark to ignite an air/fuel mixture located in the combustion chamber. During the combustion process the air/fuel mixture is ionized. Applying a voltage to spark plug 16 while the air/fuel mixture is in this ionized state produces an ion-sense ignition knock signal. A device 18, located in vehicle 12, rejects any noise in this signal.

Vehicle system 10 is responsible for insuring proper knock detection by rejecting noise in the ion-sense ignition knock signal. Knocking can cause severe damage to engine 14 as the pressure wave from the knock can destroy the cylinder thermal boundary layer, causing the cylinder and piston to reach temperatures near the actual temperature of combustion. In engine 14, this elevated temperature, combined with the pressure wave from the knock, can adversely affect the piston crown, which has a melting point much lower than the temperature of combustion. Even in engines with steel cylinder liners which can withstand the elevated temperatures, the piston rings in contact with the liners may not withstand these temperatures and may fail. Allowing engine 14 to operate under a knocking condition can therefore lead to severe engine damage.

Figure 2:
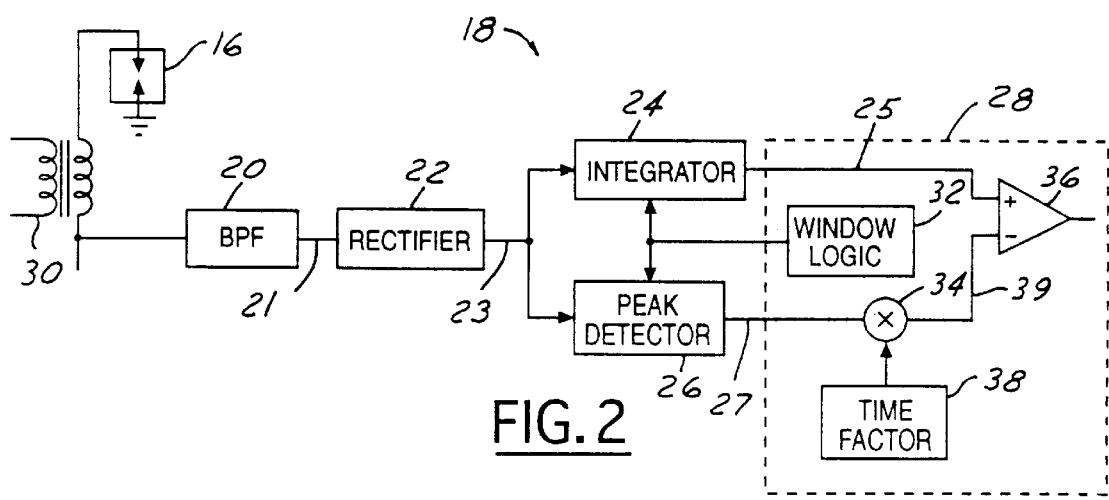
FIG. 2 is a block diagram of a device for rejecting noise in an ion-sense ignition knock signal in accordance with one embodiment of the present invention.

Referring to FIG. 2, a block diagram of a device 18 for rejecting noise in an ion-sense ignition knock signal in accordance with one embodiment of the present invention is illustrated. Device 18 includes a bandpass filter 20, a rectifier 22, an integrator 24, a peak detector 26, and a controller 28. During each cylinder firing event, an ignition coil 30 produces a high enough voltage whenever spark plug 16 generates a spark.

The ion-sense ignition knock signal is processed by bandpass filter 20, rectifier 22 and integrator 24 before knock information can be extracted. Bandpass filter 20 is coupled to spark plug 16 through ion-sensing circuitry. Bandpass filter 20 receives and filters the ion-sense ignition knock signal from internal combustion engine 14 to generate a filtered knock signal 21. Rectifier 22 is coupled to bandpass filter 20 and receives the filtered knock signal 21. The rectifier 22 then rectifies the filtered knock signal to generate a rectified knock signal 23. Integrator 24 is coupled to rectifier 22 and receives the rectified knock signal 23. Integrator 24 integrates the rectified knock signal to generate an integrated knock signal 25. The integrated knock signal is only generated during a predetermined time period or "knock window" determined by window logic 32. This integrated knock signal 25 is what prior art knock sensors use to detect knock events.

In the present invention, however, the ion sense ignition knock signal undergoes additional processing. Peak detector 26 is also coupled to rectifier 22 and receives the rectified knock signal 23. The peak detector detects the maximum voltage of the rectified knock signal and generates a peak knock signal 27. The peak knock signal 27 is generated during the predetermined time period or "knock window" determined by window logic 32 so that the detected peak corresponds to the integration of the rectified knock signal.

Controller 28 includes a multiplier 34 and a comparator 36. Multiplier 34 is coupled to peak detector 26 and receives the peak knock signal. Multiplier 34 multiplies the peak knock signal by a predetermined time factor 38 to generate an integral threshold signal 39. In one preferred embodiment, predetermined time factor 38 is approximately 300 microseconds. However, predetermined time factor 38 might be selected from the range of about 250–450 microseconds with satisfactory results. This is due to the fact that the shapes of the noise disturbances are always similar.

Comparator 36 is coupled to integrator 24 and multiplier 34 and compares the integrated knock signal 25 to the integral threshold signal 39. If the integral threshold signal is less than the integrated knock signal, then no noise disturbance occurred and the integrated knock signal is passed on to a knock detector. If, on the other hand, the integral threshold signal is greater than the integrated knock signal, a noise disturbance has occurred and the integrated signal is reduced to a minimum value, corresponding to zero, before being passed on to the knock detector.

Figure 3:
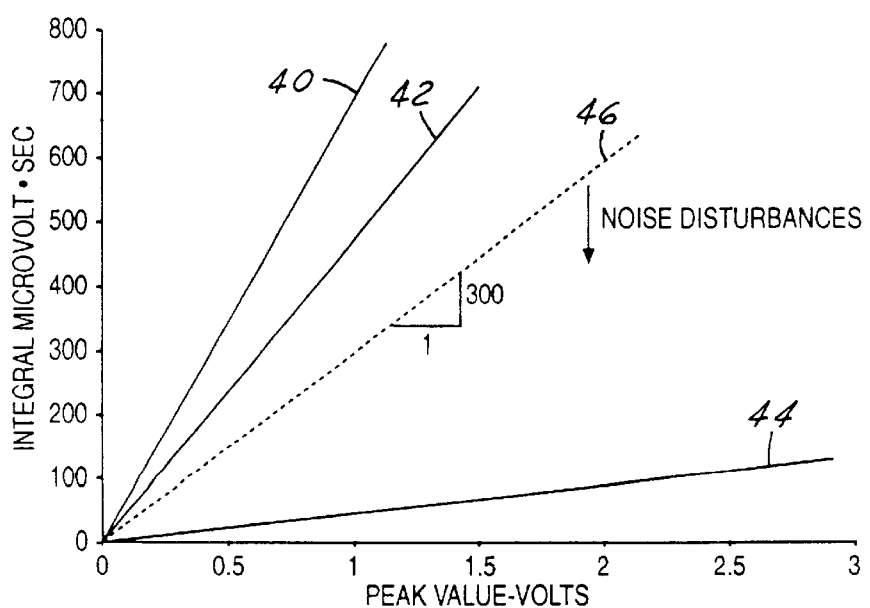
FIG. 3 is a graph comparing knock traces and a noise disturbance trace to a 300-microsecond time factor trace in accordance with one embodiment of the present invention.

Referring to FIG. 3, a graph comparing knock traces 40, 42 and a noise disturbance trace 44 to a 300-microsecond time factor trace 46 in accordance with one embodiment of the present invention is illustrated. The significance of this data is the slope of the traces. Noise disturbances, such as noise disturbance trace 44, lie on a trace with a small slope. Knock data, such as light knock trace 40 and medium knock trace 42, however, forms a band of values with a much higher slope. The dotted line, 300-microsecond time factor trace 46, discriminates the noise disturbances.

It is predetermined time factor 38 that discriminates the noise events from the knock signal. Noise disturbances have a short duration, while knock events have a much longer duration. Predetermined time factor 38 remains constant over all speeds and loads, because the shapes of the noise disturbances are always similar (short duration). Therefore, the present invention does not require extensive calibration for various operating conditions. This is because predetermined time factor 38 is not a critical value. It may be chosen from the range of 250–450 microseconds. This is because the lengths of noise disturbances are less than 250 microseconds, but knocks are more than 450 microseconds.

From the foregoing, it can be seen that there has been brought to the art a new and improved system for rejecting noise in ignition knock data. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A device for rejecting noise in an ion-sense ignition knock signal generated by an internal combustion engine, said internal combustion engine having at least one spark plug producing a spark to ignite an air/fuel mixture in a combustion chamber resulting in an air/fuel mixture in an ionized state, said ion-sense ignition knock signal produced by applying a voltage to the spark plug while the air/fuel mixture is in an ionized state, said device comprising:

a bandpass filter coupled to said spark plug and receiving said ion-sense ignition knock signal, said bandpass filter filtering said ion-sense ignition knock signal to generate a filtered knock signal;

a rectifier coupled to said bandpass filter and receiving said filtered knock signal, said rectifier rectifying said filtered knock signal to generate a rectified knock signal;

an integrator coupled to said rectifier and receiving said rectified knock signal, said integrator integrating said rectified knock signal to generate an integrated knock signal;

a peak detector coupled to said rectifier and receiving said rectified knock signal, said peak detector detecting a maximum voltage of said rectified knock signal to generate a peak knock signal;

a multiplier coupled to said peak detector and receiving said peak knock signal, said multiplier multiplying said peak knock signal by a predetermined time factor to generate an integral threshold signal; and a comparitor coupled to said integrator and said multiplier, said comparitor receiving said integrated knock signal and said integral threshold signal, said comparitor comparing said integrated knock signal to said integral threshold signal.

2. The device for rejecting noise in an ion-sense ignition knock signal as recited in claim 1, wherein said comparator generates a knock information signal proportional to said integrated knock signal when said integrated knock signal is greater than said integral threshold signal.

3. The device for rejecting noise in an ion-sense ignition knock signal as recited in claim 1, wherein said comparator generates a minimum knock information signal when said integrated knock signal is less than said integral threshold signal.

4. The device for rejecting noise in an ion-sense ignition knock signal as recited in claim 1, wherein said integrator generates said integrated knock signal only during a predetermined time period.

5. The device for rejecting noise in an ion-sense ignition knock signal as recited in claim 4, wherein said peak detector only generates a peak knock signal during said predetermined time period.

6. The device for rejecting noise in an ion-sense ignition knock signal as recited in claim 5, wherein said multiplier only generates an integral threshold signal during said predetermined time period.

7. The device for rejecting noise in an ion-sense ignition knock signal as recited in claim 6, wherein said predetermined time period occurs during a knock window.

8. The device for rejecting noise in an ion-sense ignition knock signal as recited in claim 1, wherein said time factor is a value ranging from approximately 250 to 450 microseconds.

9. The device for rejecting noise in an ion-sense ignition knock signal as recited in claim 8, wherein said time factor is approximately 300 microseconds.

10. A vehicle system for rejecting noise in an ion-sense ignition knock signal generated by an internal combustion engine, said internal combustion engine having at least one spark plug producing a spark to ignite an air/fuel mixture in a combustion chamber resulting in an air/fuel mixture in an ionized state, said ion-sense ignition knock signal produced by applying a voltage to the spark plug while the air/fuel texture is in an ionized state, said device comprising:

a vehicle having a device for rejecting noise in said ion-sense ignition knock signal, said device comprising;

a bandpass filter in said vehicle, said bandpass filter coupled to said spark plug and receiving said ion-sense ignition knock signal, said bandpass filter filtering said ion-sense ignition knock signal to generate a filtered knock signal;

a rectifier in said vehicle, said rectifier coupled to said bandpass filter and receiving said filtered knock signal, said rectifier rectifying said filtered knock signal to generate a rectified knock signal;

an integrator in said vehicle, said integrator coupled to said rectifier and receiving said rectified knock signal, said integrator integrating said rectified knock signal to generate an integrated knock signal;

a peak detector in said vehicle, said peak detector coupled to said rectifier and receiving said rectified knock signal, said peak detector detecting a maximum voltage of said rectified knock signal to generate a peak knock signal; and a controller coupled to said integrator and said peak detector, said controller receiving said integrated knock signal and said peak knock signal, said controller having control logic operative to multiply said peak knock signal by a predetermined time factor to generate an integral threshold signal, and compare said integrated knock signal to said integral threshold signal.

11. The system for rejecting noise in an ion-sense ignition knock signal as recited in claim 10, wherein said controller generates a knock information signal proportional to said integrated knock signal when said integrated knock signal is greater than said integral threshold signal.

12. The system for rejecting noise in an ion-sense ignition knock signal as recited in claim 10, wherein said controller generates a minimum knock information signal when said integrated knock signal is less than said integral threshold signal.

13. The system for rejecting noise in an ion-sense ignition knock signal as recited in claim 10, wherein said integrator generates said integrated knock signal only during a predetermined time period.

14. The system for rejecting noise in an ion-sense ignition knock signal as recited in claim 13, wherein said peak detector only generates a peak knock signal during said predetermined time period.

15. The system for rejecting noise in an ion-sense ignition knock signal as recited in claim 14, wherein said controller only generates an integral threshold signal during said predetermined time period.

16. The system for rejecting noise in an ion-sense ignition knock signal as recited in claim 15, wherein said predetermined time period occurs during a knock window.

17. The system for rejecting noise in an ion-sense ignition knock signal as recited in claim 10, wherein said time factor is a value ranging from approximately 250 to 450 microseconds.

18. The system for rejecting noise in an ion-sense ignition knock signal as recited in claim 17, wherein said time factor is approximately 300 microseconds.

19. A method of rejecting noise in an ion-sense ignition knock sign comprising the steps of:

filtering said ion-sense ignition knock signal to generate a filtered knock signal;

rectifying said filtered knock signal to generate a rectified knock signal;

integrating said rectified knock signal to generate an integrated knock signal;

detecting a maximum voltage of said rectified knock signal to generate a peak knock signal;

multiplying said peak knock signal by predetermined time factor to generate an integral threshold signal; and comparing said integrated knock signal to said integral threshold signal.

20. The method of rejecting noise in an ion-sense ignition knock signal as recited in claim 19, wherein said step of comparing further comprises generating a knock information signal proportional to said integrated knock signal when said integrated knock signal is greater than said integral threshold signal.

21. The method of rejecting noise in an ion-sense ignition knock signal as recited in claim 19, wherein said step of comparing further comprises generating a minimum knock information signal when said integrated knock signal is less than said integral threshold signal.

* * * * *